(12) United States Patent
Markow

(10) Patent No.: US 9,976,774 B1
(45) Date of Patent: May 22, 2018

(54) HEATING SYSTEM, KIT AND METHOD OF USING

(71) Applicant: Richard C. Markow, Tiverton, RI (US)

(72) Inventor: Richard C. Markow, Tiverton, RI (US)

(*) Notice: Subject to any disclaimer, the term of this patent is extended or adjusted under 35 U.S.C. 154(b) by 555 days.

(21) Appl. No.: 14/563,666

(22) Filed: Dec. 8, 2014

Related U.S. Application Data

(60) Provisional application No. 61/912,756, filed on Dec. 6, 2013.

(51) Int. Cl.
| | | |
|---|---|---|
| *F24D 19/04* | (2006.01) | |
| *F24H 3/02* | (2006.01) | |
| *F24H 3/04* | (2006.01) | |
| *F24H 9/20* | (2006.01) | |
| *F24D 13/04* | (2006.01) | |

(52) U.S. Cl.
CPC .......... *F24H 3/0411* (2013.01); *F24D 13/04* (2013.01); *F24H 9/2071* (2013.01)

(58) Field of Classification Search
None
See application file for complete search history.

(56) References Cited

U.S. PATENT DOCUMENTS

| | | | | |
|---|---|---|---|---|
| 2,722,594 A * | 11/1955 | Kueser | ............... | H05B 1/0213 |
| | | | | 219/220 |
| 2,820,880 A * | 1/1958 | Huntsinger | ........... | F24H 3/0411 |
| | | | | 126/99 R |
| 3,151,670 A | 7/1962 | Kritzer | | |
| 3,151,671 A | 7/1962 | Kritzer | | |
| 3,176,117 A * | 3/1965 | Knoll | .................. | F24H 3/0411 |
| | | | | 165/121 |
| 3,324,938 A | 6/1967 | Berkoff | | |
| 3,395,752 A | 8/1968 | Fowell | | |
| 3,564,201 A * | 2/1971 | Jones | .................... | A61H 33/06 |
| | | | | 165/129 |
| 3,768,549 A * | 10/1973 | Goodie | .................. | F28D 1/024 |
| | | | | 165/122 |
| 4,126,268 A | 11/1978 | Vitale | | |
| 4,511,786 A | 4/1985 | Jansen | | |
| 4,518,847 A * | 5/1985 | Horst, Sr. | ............. | F24H 3/081 |
| | | | | 126/101 |

(Continued)

*Primary Examiner* — Thor Campbell
(74) *Attorney, Agent, or Firm* — Maxwell L. Minch; GrayRobinson, P.A.

(57) ABSTRACT

A system and method for improving the responsiveness of forced hot water heat exchangers placed around the baseboards of conditioned living spaces and improving the efficiently of centralized hot water heating systems. The control system may comprise replacement baseboard heat exchanger cover, a blower, a diffuser and a sensor which are mounted to one or more baseboard heat exchangers. When heating system and forced hot water reaches its operating temperature, the blower activates to rapidly transfer energy from the heated water into the air and disperse treated, heated air into the room. After the centralized heating system turns off, the system continues to disperse the treated, heated air until the latent heat of the heating element centralized heating system has been extracted and the return loop temperatures are at levels consistent with optimal boiler performance.

11 Claims, 3 Drawing Sheets

(56) References Cited

U.S. PATENT DOCUMENTS

| | | | | |
|---|---|---|---|---|
| 4,888,469 | A | * | 12/1989 | Hennuy ............... F24H 3/0417 |
| | | | | 392/347 |
| 4,965,432 | A | * | 10/1990 | Harris ................. B60H 1/0025 |
| | | | | 219/203 |
| 5,181,884 | A | | 1/1993 | Ducharme |
| 5,278,936 | A | * | 1/1994 | Shao .................... F24H 3/0417 |
| | | | | 219/492 |
| 5,553,701 | A | * | 9/1996 | Jarecki .................. B44D 3/126 |
| | | | | 15/257.06 |
| 5,730,644 | A | * | 3/1998 | Pfanstiehl .............. B05C 17/00 |
| | | | | 15/169 |
| 5,790,748 | A | | 8/1998 | Tamhane |
| 6,808,018 | B1 | | 10/2004 | Toner |
| 6,973,260 | B2 | * | 12/2005 | Orr ...................... F24H 9/1872 |
| | | | | 392/360 |
| 6,987,250 | B2 | * | 1/2006 | Levy ........................ F24F 6/00 |
| | | | | 219/483 |
| 7,109,444 | B2 | * | 9/2006 | Levy ........................ F24F 6/00 |
| | | | | 219/483 |
| 7,338,227 | B2 | * | 3/2008 | Bullivant ........... A46B 11/0013 |
| | | | | 401/208 |
| 7,532,810 | B2 | * | 5/2009 | Jayaram ............... F24H 3/0417 |
| | | | | 34/266 |
| 8,467,668 | B2 | * | 6/2013 | Searle .................. F24H 3/0417 |
| | | | | 219/210 |
| 2005/0078952 | A1 | | 4/2005 | Bain et al. |
| 2006/0105112 | A1 | * | 5/2006 | Janssen ................. B44D 2/002 |
| | | | | 427/429 |
| 2007/0049176 | A1 | * | 3/2007 | Jones ................... B24B 23/028 |
| | | | | 451/28 |
| 2014/0308432 | A1 | * | 10/2014 | VanGemert ............ B44D 3/003 |
| | | | | 427/8 |

\* cited by examiner

HEATING SYSTEM, KIT AND METHOD OF USING

CROSS-REFERENCE TO RELATED APPLICATIONS

This application claims priority to and benefit of U.S. Provisional Application No. 61/912,756, filed on Dec. 6, 2013, entitled HEATING SYSTEM, KIT, AND METHOD OF USING, which is incorporated by reference herein in its entirety and for all purposes.

FIELD OF THE INVENTION

The present teachings relate generally to heating systems and, more particularly, to natural convection heating systems.

BACKGROUND

In natural convection heating systems, a heating element is warmed by the water that circulates within its pipes which intern warms the air surrounding the element. Hot air, being less dense than cool air, rises. The rising heated air draws cool air to flow in to take its place. This sets up a current of hot air that leaves the heater and which passively mixes throughout the room in order to heat the space to the desired temperature. These types of heating systems are very safe and there is a very low chance of getting burned.

Hot water heating systems operate on the premise of radiant heat. Water is heated to a relatively high temperature, typically from 140° F. to 200° F., by a central boiler and circulated through a series of pipes to a heating element, or series of heating elements, located within the space(s) to he heated. The typical hot water heating system is inefficiently controlled: it heats relatively large volumes of water for relatively small areas of heat transfer, circulates on for short periods of time, and stays off and at idle for comparatively long periods of time. The time periods when these systems are off and idling are typically two to three times longer than when circulating or "on". While idling, these systems maintain operating boiler temperatures which results in actual operating efficiencies that are significantly less than peak optimal performance. Inefficient boiler controls, idle losses, poor heat transfer and the inability to effectively monitor and optimize temperature controls at the individual heat exchanger result in overall system efficiencies of under 50%.

Hydronic heaters are a type of natural convection heater that use heated water or another heated liquid to transfer heat from the primary heat source, generally a remotely located furnace, to the space that is being heated. They are typically positioned along the base of a wall, drawing in cool air at the lower end of the unit, heating it, and allowing the heated air to escape out of the top. Low external operating temperatures allow these types of heaters to be installed flush against a wall or baseboard without damage to the wall or baseboard. Hydronic heaters are usually installed when a house is being constructed or in conjunction with other renovations since they are required to be plumbed into a boiler or other remote heat source and work in conjunction with other heating units to evenly heat the entire structure and may require electrical integration making them difficult to add post-construction.

Electric heaters are another type of natural convection heater. They differ from hydronic heaters in that the primary heat source is an electric heating element located within each unit. They do not have to be connected with household plumbing. These heaters are wired into the household power supply, and most can also be controlled by an internal or remote thermostat. Electric baseboard heaters are far easier to install than hydronic heaters but the cost of operations are greater.

Natural convection heaters are easily blocked by furniture, curtains, or other obstructions, which prevent heated air from evenly circulating throughout a room. Because they heat by convection, natural convection heaters are passive and heat a space relatively slowly. Unlike more expensive forced air heating systems, which can be linked to an air conditioning system, natural convection heaters are necessarily separate from a cooling counterpart.

Significant cost reductions and improvements in overall system efficiencies can be achieved by improving boiler control strategies, intelligently controlling room temperature according to need, and/or altering the distribution of heat within the building to better meet demand.

SUMMARY

The embodiments provide a superior system and method for natural convection heating that provides affordable and efficient heating capabilities that can be used with existing baseboard heating systems without the need for costly upgrades or extensive renovations.

The heating system disclosed herein may be used in conjunction with natural convection baseboard heaters in residential setting or anywhere where more efficient heating is beneficial. The heating system includes a blower which draws relatively cool air in and directs it across an existing heat exchanger. The heated air may be freshened and deodorized as it exits the heating system. The blower is able to direct a large volume of air across the heat exchanger in a shorter period of time, allowing heat to be transferred more quickly and resulting in the heating of the space more rapidly. The heating system may also include a sensor to detect when the baseboard heater has reached an optimal heating temperature. The heating system is preferably constructed so that it may be installed by the average homeowner with basic tools in under an hour.

One embodiment of the system of the invention described herein is a heating system for use with a convection heater, the heating system including a housing cover, the housing cover having a control panel; a blower inside the housing cover configured to draw air into the blower; a sensor in communication with the control panel and the blower; wherein the sensor activates the blower when the convection heater reaches a first predetermined temperature and deactivates the blower when the convection heater reaches a second predetermined temperature, the first predetermined temperature and the second predetermined temperature capable of being set on the control panel.

Another embodiment of the system of the invention described herein is a face plate for a natural convection heater, the face plate including at least one heating system, the at least one heating system having a housing cover, the housing cover including a control panel; a blower inside the housing cover configured to draw air into the blower; a sensor in communication with the control panel and the blower; wherein the sensor activates the blower when the convection heater reaches a first predetermined temperature and deactivates the blower when the convection heater reaches a second predetermined temperature, the first predetermined temperature and the second predetermined temperature capable of being set on the control panel.

Embodiments of the method of the invention described herein include a method of increasing the efficiency of a convection heater in communication with a remote heat source, the method including: 1) installing a heating system on the convection heater, the heating system having a housing cover, the housing cover including a control panel; a blower disposed inside the housing cover configured to draw air into the blower; a sensor in communication with the control panel and the blower; wherein the sensor activates the blower when the convection heater reaches a first predetermined temperature and deactivates the blower when the convection heater reaches a second predetermined temperature, the first predetermined temperature and the second predetermined temperature capable of being set on the control panel; 2) activating the remote heat source; 3) verifying that the heating system turns on at a first predetermined temperature; 4) shutting off the remote heat source; and 5) verify that heating system turns off at a second predetermined temperature.

Embodiments of the kit of the invention described herein include a kit having: 1) a heating system, the heating system including a housing cover, the housing cover having a control panel; a blower inside the housing cover configured to draw air into the blower; and a sensor in communication with the control panel and the blower; 2) a preparation solution for painting the housing cover; and 3) a paint for painting the housing cover.

Other embodiments of the system, method and kit are described in detail below and are also part of the present teachings.

BRIEF DESCRIPTION OF THE DRAWINGS

For a better understanding of the present embodiments, together with other and further aspects thereof, reference is made to the accompanying drawings and detailed description.

DETAILED DESCRIPTION

Figure 1:
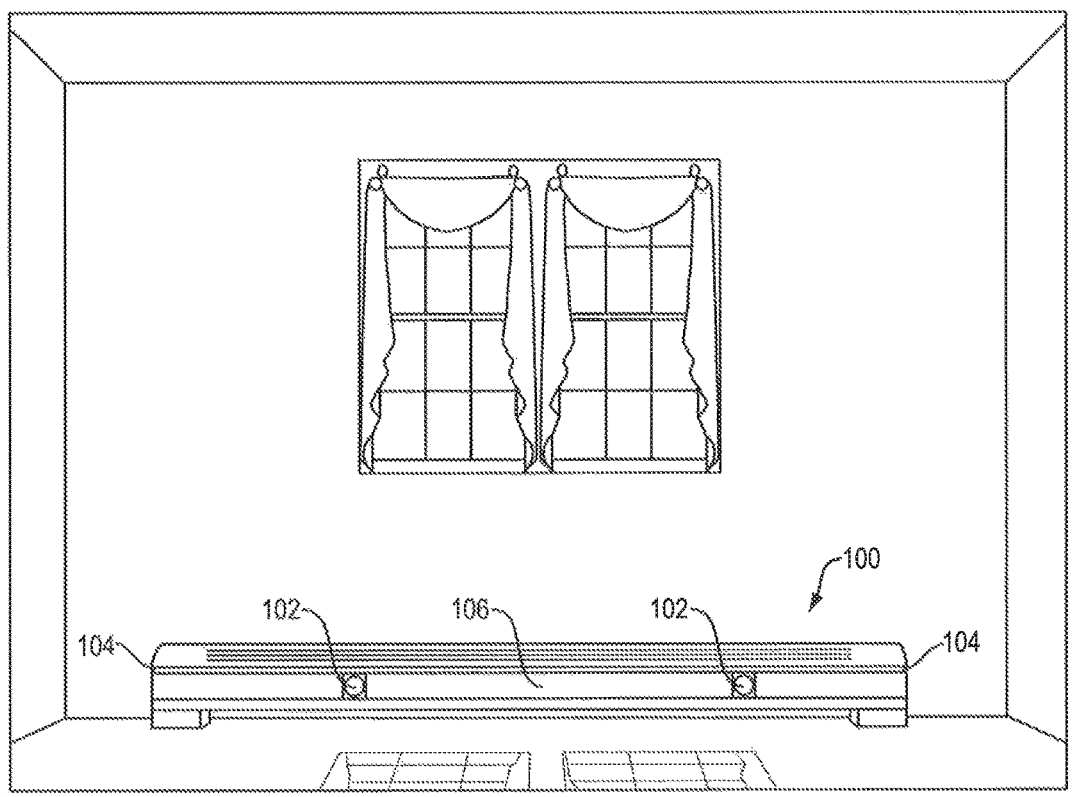
FIG. 1 is a pictorial of one embodiment of the heating system.

In the description that follows, like components have been given the same reference numerals, regardless of whether they are shown in different examples. To illustrate an example(s) of the present teachings in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Referring now to FIG. 1, two examples of the heating system 102 of the claimed invention are shown as installed on a face plate 106 of a baseboard heater 100. A face plate 106 that already incorporates the heating system 102 can replace an existing face plate 106 of a baseboard heater 100, or the heating system 102 may be incorporated into the existing face plate 106 of the baseboard heater 100. The face plate 106 typically fits over a heat exchanger 112 (see FIG. 2). At each end of the face plate 106 is an end cap 104. The end cap 104 covers the exposed side of the heat exchanger 112. It also further secures the face plate 106 and provides structural stability to the entire baseboard heater 100. The heating system 102 may be installed on any number of different parts of a baseboard heater 100, including the end caps 104, and it is not limited to face plates 106.

Figure 2:
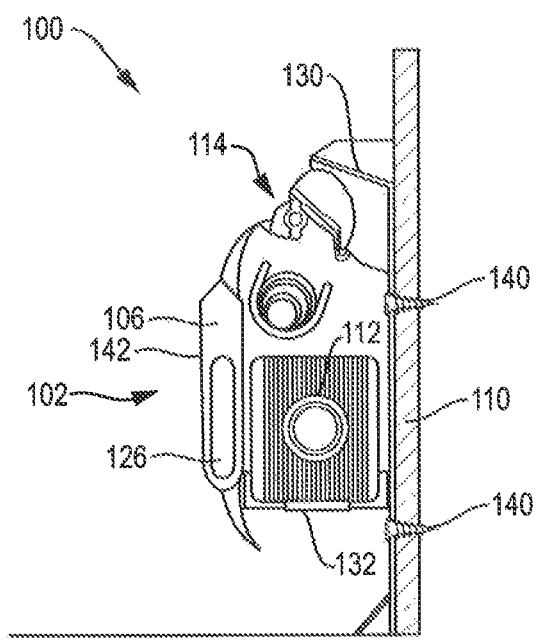
FIG. 2 is a schematic illustration of the side view of a one embodiment of the heating system employed on a baseboard heater.

FIG. 2 is a schematic illustration of the side view of one embodiment of the heating system 102 employed on a baseboard heater 100. Face plates 106 are typically held in place by engaging a mounting bracket 110. The mounting bracket 110 may be adjustable and slide in or out and/or up or down to fit a wide variety of applications. The mounting bracket 110 may also incorporate a securing means 140, such as set screw, to secure the mounting bracket 100 at the proper fit for the given application. The mounting bracket 110 may mount the baseboard heater 100 through the wallboard to the stud behind the wall (not shown). The face plate 106 may hook under a lower portion 130 of the bracket 110 and over an upper portion 132 of the bracket 110. The heating system 102 also includes a blower 126, which may be a traditional induction fan or a squirrel cage design, although not limited thereto.

When activated, the blower 126 draws colder air from the floor and across the heat exchanger 112. By placing the heating system 102 adjacent to the heat exchanger 112, the heating system 102 easily senses temperature changes at the level of the heating system 102. This makes the baseboard heater 100 much more efficient in responding to changes in atmospheric conditions within an individual room or temperature zone. Heated air then exits the heating system 102 at the top through opening 114. The heating system 102 may be factory set to turn on and turn off automatically when the baseboard heater 100 reaches a predetermined temperature. In the alternative, the heating system 102 may incorporate its own control panel 120 (shown in FIG. 3) to control when the blower 126 turns on and off. The heating system 102 not only increases efficiency of distributing heat, but also increases the speed of delivering conditioned air. Instead of turning on the heat and waiting to feel the effects, the heating system 102 provides virtually instantaneous response time.

Figure 3:
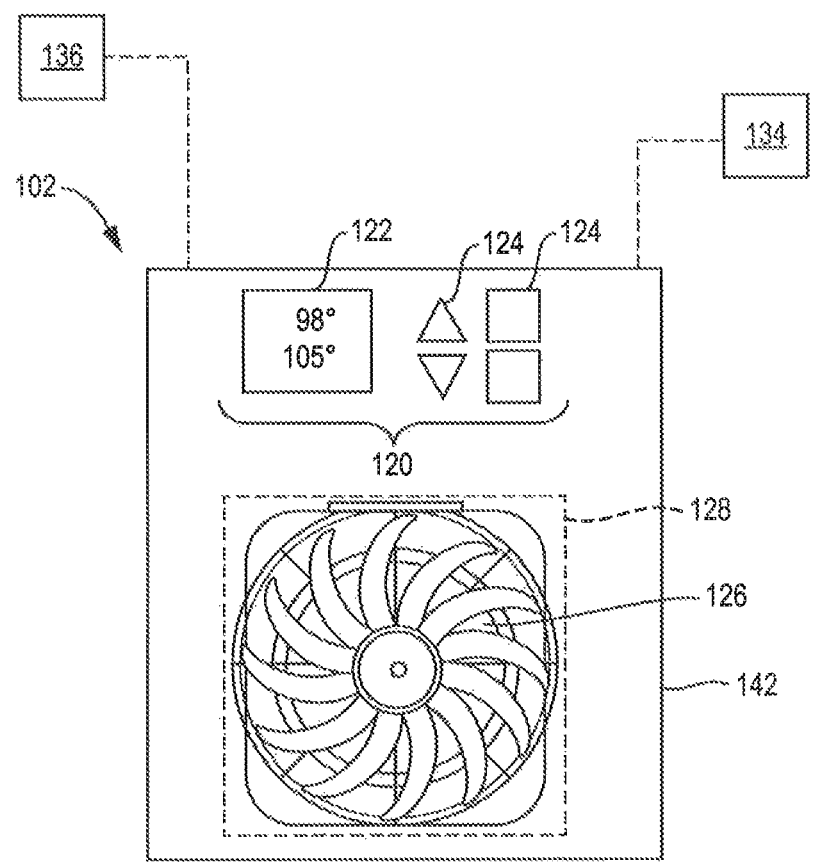
FIG. 3 is a schematic pictorial of one embodiment of the heating system with a control panel.

FIG. 3 is a schematic pictorial of one embodiment of the heating system 102, including housing cover 142, blower 126, and control panel 120. The control panel 120 may have an LED or other display 122 in order to show various indicators and settings, which may be controlled using control buttons 124. The heating system 102 may also incorporate a diffuser 128 such as a filter, air purifier, or air freshener. A HEPA filter, for example, may filter the air for particulates, providing a benefit for asthma and allergy sufferers. In addition, the diffuser 128 may comprise a humidifier, dehumidifier, or oil diffusers, although not limited thereto. The heating system 102 may also help to direct the treated air in a particular direction using louvers, vents or the like (not shown). This may assist the heating ability of the baseboard heater 100 if it is obstructed by carpeting, drapery and furniture.

As also shown in FIG. 3, one or more temperature sensors 138 may be incorporated into the heating system in various locations and provide information to the control panel 120. The heating system 102 may also include a power source 134. The power source 134 may comprise one or more batteries including, for example, a lithium ion battery or batteries. With batteries, the heating system 102 may be installed without the need of hardwiring into the building's electrical system. In the alternative, the heating system 102 may be hardwired to a 120v or 240v power supply 134 with no batteries to charge or replace. The heating system 102 may also incorporate a mounted or remote control panel 136 to control the operations of the heating system 102 and output the data captured by the sensors 138.

The heating system 102 may be self-contained, and may operate independently from other heating systems 102. Users may install as many heating systems 102 as needed to provide for more efficient and responsive heat. At least the housing cover 140 of heating system 102 may be constructed in standard baseboard heater colors such as black, white, off-white, and brown, although not limited thereto, in order to provide for aesthetic benefits. If sold in a kit, the heating system 102 may come packed with preparation solution and paint so that a user can match the housing cover 140 to the installed components of their existing baseboard 100. In other embodiments not shown, the heating system 102 may be installed into other heating components by draining the baseboard heater 100, cutting the influent and effluent piping, removing the existing components, reinstalling the heating system 102 and reconnecting the piping through either a solder or compression fitting.

After installing the heating system 102, a user may test it by first turning the home thermostat to its maximum setting in order to activate the remote heat source (e.g., furnace) and verifying that the heating system 102 turns on at factory preset (or control panel set) temperature (e.g., 105° F., etc.). When the baseboard heater 100 temperature reaches the predetermined temperature, the heating system 102 will cycle on, drawing cool air from the floor and directing it across the heat exchanger 112 and through the opening 114 at the top. Next, the user may shut off the home thermostat and verify that heating system 102 cycles off at its factory preset (or control panel set) temperature (e.g., 98° F., etc.). A differential in the cycle on and cycle off settings helps to extract all of the latent heat in the baseboard heater 100, thus maximizing system efficiencies.

The heating system 102 may be manufactured in any number of different processes. The following process is presented for illustrative purposed only and the present teachings are not limited thereto. First, one may stamp out a face plate 106 in a standard size such as 4', 6', 8' and 12', although not limited thereto. The face plate 106 may then be die cut with intake openings. A blower 126 may be mounted to the face plate 106 and a diffuser 128 may be added to enclose the blower 126. A control panel 120 may then be mounted to the housing cover 142 on one end with insulation, ensuring that it is protected from the direct heat of the baseboard heater 100. At the other end of the housing cover 142, an opening for a power source 134, such as a battery, may be cut out of the housing cover 142 and a battery holder and connections may be installed. Finally, the heating system 102 may be installed by mounting the face plate 106 to the mounting brackets 110 and replacing the end caps 104.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of the disclosure and its legal equivalents, as understood by those of skill in the art relying upon the disclosure in this specification and the attached drawings.

What is claimed is:

1. A heating control system and method for improving the heat transfer of hydronic baseboard heat exchangers and the efficiency of centralized forced hot water heating systems, the heating control system comprising:
    a plate formed to replace an existing cover of a hydronic baseboard heat exchanger, said plate having at least an internal facing side and an external facing side;
    a control panel mounted to said internal facing side of said plate;
    a blower mounted to the internal facing side of said plate, said blower configured to draw air into the blower from the ambient surroundings of said heater; and,
    a sensor in communication with the control panel and the blower;
    wherein the sensor activates the blower when the baseboard heat exchanger reaches a first predetermined temperature and deactivates the blower when the convection heater reaches a second predetermined temperature, the first predetermined temperature and the second predetermined temperature capable of being set from the control panel;
    wherein said plate is attached to said heat exchanger with the internal facing side facing the internal components of said heat exchanger.

2. The heating control system of claim 1, wherein the control panel comprises a display.

3. The heating control system of claim 2, wherein the display is an LED display.

4. The heating control system of claim 1, comprising a diffuser in communication with the blower.

5. The heating control system of claim 4, wherein said diffuser is an air filter, an air purifier, an air freshener, a humidifier, a dehumidifier, an oil diffuser, or combinations thereof.

6. The heating control system of claim 1, comprising one or more power source.

7. The heating control system of claim 6, wherein the one or more power source is a battery, a hard-wired, electrical power supply, a plug to an electrical power supply, or combinations thereof.

8. The heating control system of claim 1, wherein the sensor is a temperature sensor, a fuel sensor, a power sensor, or combinations thereof.

9. The heating control system of claim 1, further comprising a communication means for communication between the heating control system and a remote control or for communication between two or more heating control systems.

10. The heating control system of claim 1, wherein said control panel dynamically adjusts blower operations to increase or decrease return loop temperatures of said hydronic baseboard heat exchangers adjust heater efficiency.

11. The heating control systems of claim 1 wherein dynamic communication is accomplished via a wireless network, a home automation network, a wireline system, an Ethernet or other comparable communications means.

* * * * *